United States Patent
Dadam et al.

(10) Patent No.: US 11,215,532 B2
(45) Date of Patent: Jan. 4, 2022

(54) METHODS AND SYSTEMS FOR EXHAUST GAS RECIRCULATION SYSTEM DIAGNOSTICS

(71) Applicant: Ford Global Technologies, LLC, Dearborn, MI (US)

(72) Inventors: Sumanth Reddy Dadam, Dearborn, MI (US); Robert Roy Jentz, Westland, MI (US); Herbert Thomas Meissner, South Lyon, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 60 days.

(21) Appl. No.: 16/865,939

(22) Filed: May 4, 2020

(65) Prior Publication Data

US 2021/0341356 A1 Nov. 4, 2021

(51) Int. Cl.
| | |
|---|---|
| *G01M 15/10* | (2006.01) |
| *F02M 26/49* | (2016.01) |
| *F02M 26/52* | (2016.01) |
| *F02D 41/00* | (2006.01) |
| *F02P 5/14* | (2006.01) |
| *F02D 41/30* | (2006.01) |
| *F02M 26/47* | (2016.01) |

(52) U.S. Cl.
CPC ....... *G01M 15/106* (2013.01); *F02D 41/0077* (2013.01); *F02D 41/30* (2013.01); *F02M 26/47* (2016.02); *F02M 26/49* (2016.02); *F02M 26/52* (2016.02); *F02P 5/14* (2013.01)

(58) Field of Classification Search
CPC ..... G01M 15/106; F02M 26/49; F02M 26/52; F02M 26/47; F02P 5/14; F02D 41/0077; F02D 41/30
See application file for complete search history.

(56) References Cited

U.S. PATENT DOCUMENTS

| | | | | |
|---|---|---|---|---|
| 5,257,610 | A * | 11/1993 | Ohuchi | F02M 26/49 123/568.16 |
| 5,297,047 | A * | 3/1994 | Matsuno | F02D 41/221 701/107 |
| 10,532,988 | B2 | 1/2020 | Munigeti et al. | |
| 2007/0062499 | A1* | 3/2007 | Miyasako | F02M 26/49 123/568.16 |
| 2013/0139795 | A1* | 6/2013 | Saitoh | F02M 26/49 123/568.16 |
| 2016/0290255 | A1* | 10/2016 | Miyahara | F02D 41/222 |
| 2018/0320611 | A1* | 11/2018 | Glugla | F02D 43/04 |
| 2020/0063670 | A1* | 2/2020 | Asanuma | F02D 41/12 |

\* cited by examiner

*Primary Examiner* — George C Jin
(74) *Attorney, Agent, or Firm* — Geoffrey Brumbaugh; McCoy Russell LLP (57) ABSTRACT

Methods and systems are provided for an EGR system reverse hose diagnostic. In one example, a method includes executing the reverse hose diagnostic in response to an EGR flowrate exceeding a threshold flow rate.

20 Claims, 5 Drawing Sheets

METHODS AND SYSTEMS FOR EXHAUST GAS RECIRCULATION SYSTEM DIAGNOSTICS

FIELD

The present description relates generally to diagnosing a delta pressure sensor of an exhaust gas recirculation (EGR) system.

BACKGROUND/SUMMARY

Engine systems may utilize recirculation of exhaust gas from an engine exhaust system to an engine intake system, a process referred to as exhaust gas recirculation (EGR), to reduce regulated emissions. An EGR valve may be controlled to achieve a desired intake air dilution for the given engine operating conditions. Traditionally, the amount of low pressure EGR (LP-EGR) and/or high pressure EGR (HP-EGR) routed through the EGR system is measured and adjusted based on engine speed, engine temperature, and load during engine operation to maintain desirable combustion stability of the engine while providing emissions and fuel economy benefits. EGR effectively cools combustion chamber temperatures thereby reducing NOx formation.

Current emission standards in some countries may require vehicle manufactures to execute EGR delta pressure sensor reverse hose diagnostics periodically. In some examples, the delta pressure sensor is arranged upstream of the EGR valve relative to a direction of EGR flow. However, contaminants in the EGR resulting in degradation of the delta pressure sensor. Later examples included moving the delta pressure sensor downstream of the EGR valve to decrease contact between EGR contaminants and the delta pressure sensor. Based on the delta pressure positioning downstream of the EGR valve, the reverse hose diagnostic is executed with the EGR valve closed. Intake pressures are adjusted by adjusting the engine RPM to determine if the hoses are reversed based on a sensed delta pressure. However, this method of executing the reverse hose diagnostic may provide inaccurate or incomplete results due to fluctuations in ghost flow noise. As such, a more consistent method for executing the reverse hose diagnostic is desired.

In one example, the issues described above may be addressed by a method comprising executing a reverse hose diagnostic in response to an exhaust-gas recirculate (EGR) flow rate exceeding a threshold. In this way, the diagnostic is executed during conditions where a higher flow rate reduces the effects of the ghost flow noise.

As one example, the threshold is at least partially based on a ghost flow noise measured when the EGR valve is closed prior to the reverse hose diagnostic. Additionally or alternatively, the threshold is based on a highest ghost flow noise for all engine operating conditions. By executing the reverse hose diagnostic with the EGR valve open, a likelihood of completion of the diagnostic is increased.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
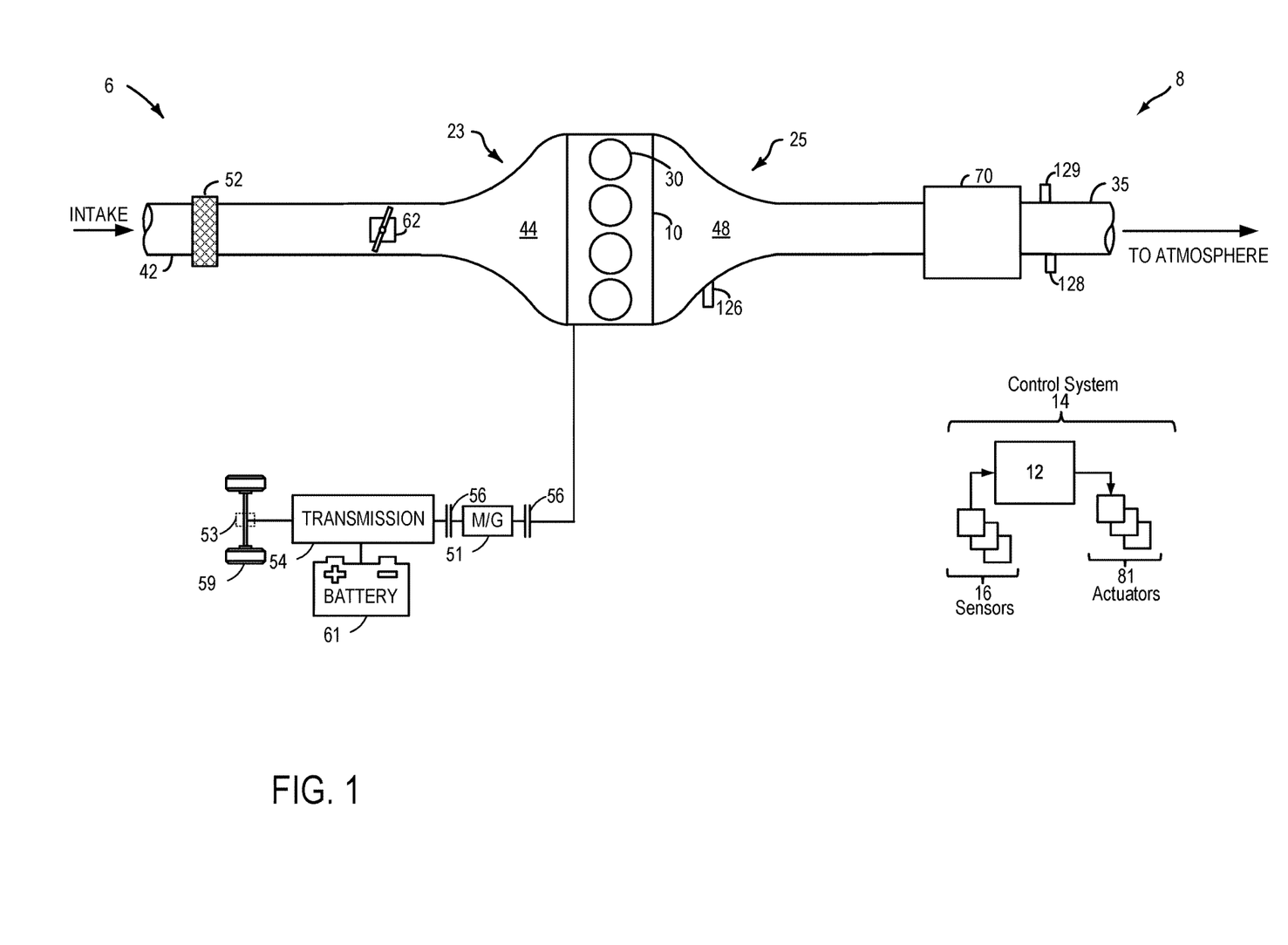
FIG. 1 shows an engine of a hybrid vehicle.
Figure 2:
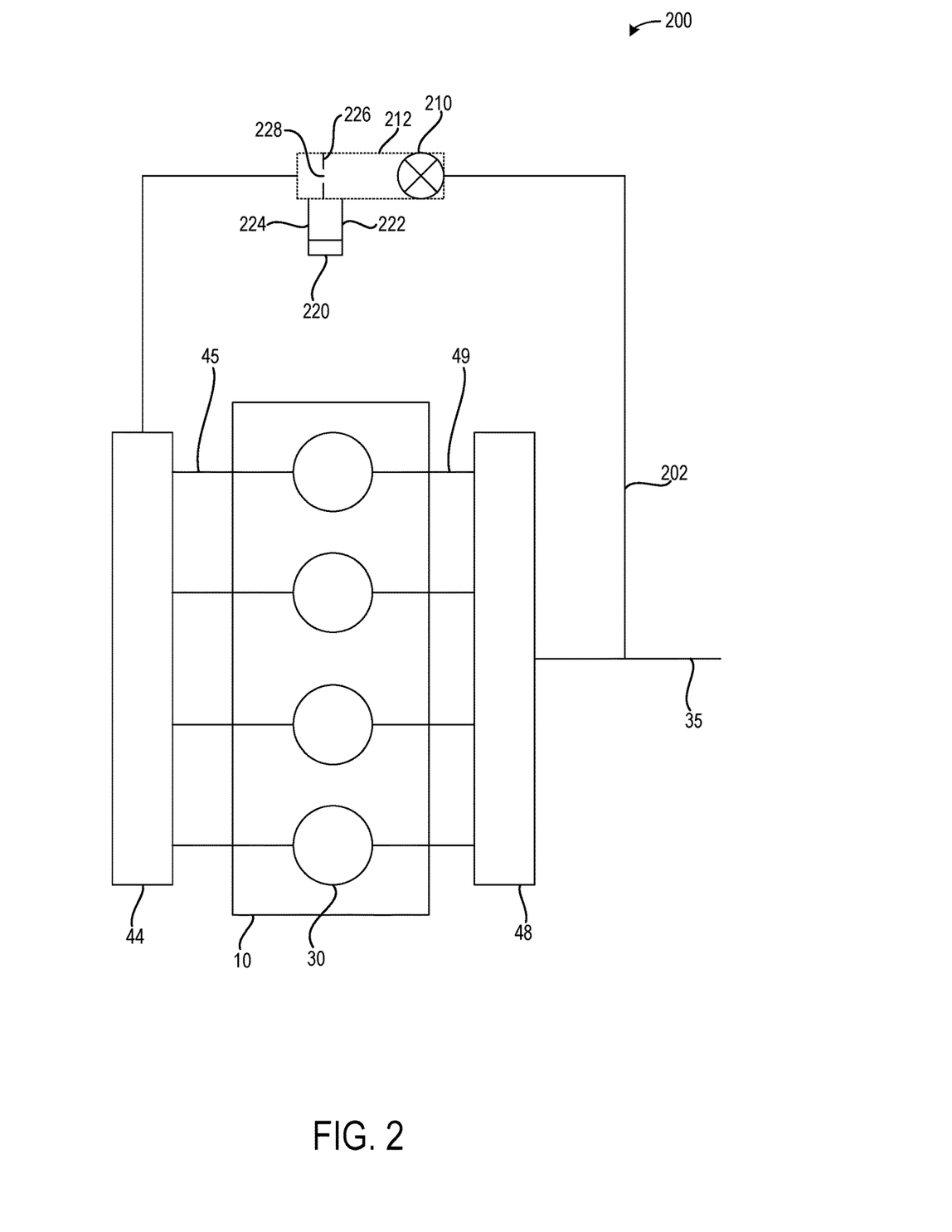
FIG. 2 shows an engine comprising a delta pressure sensor downstream of an EGR valve.
Figure 3:
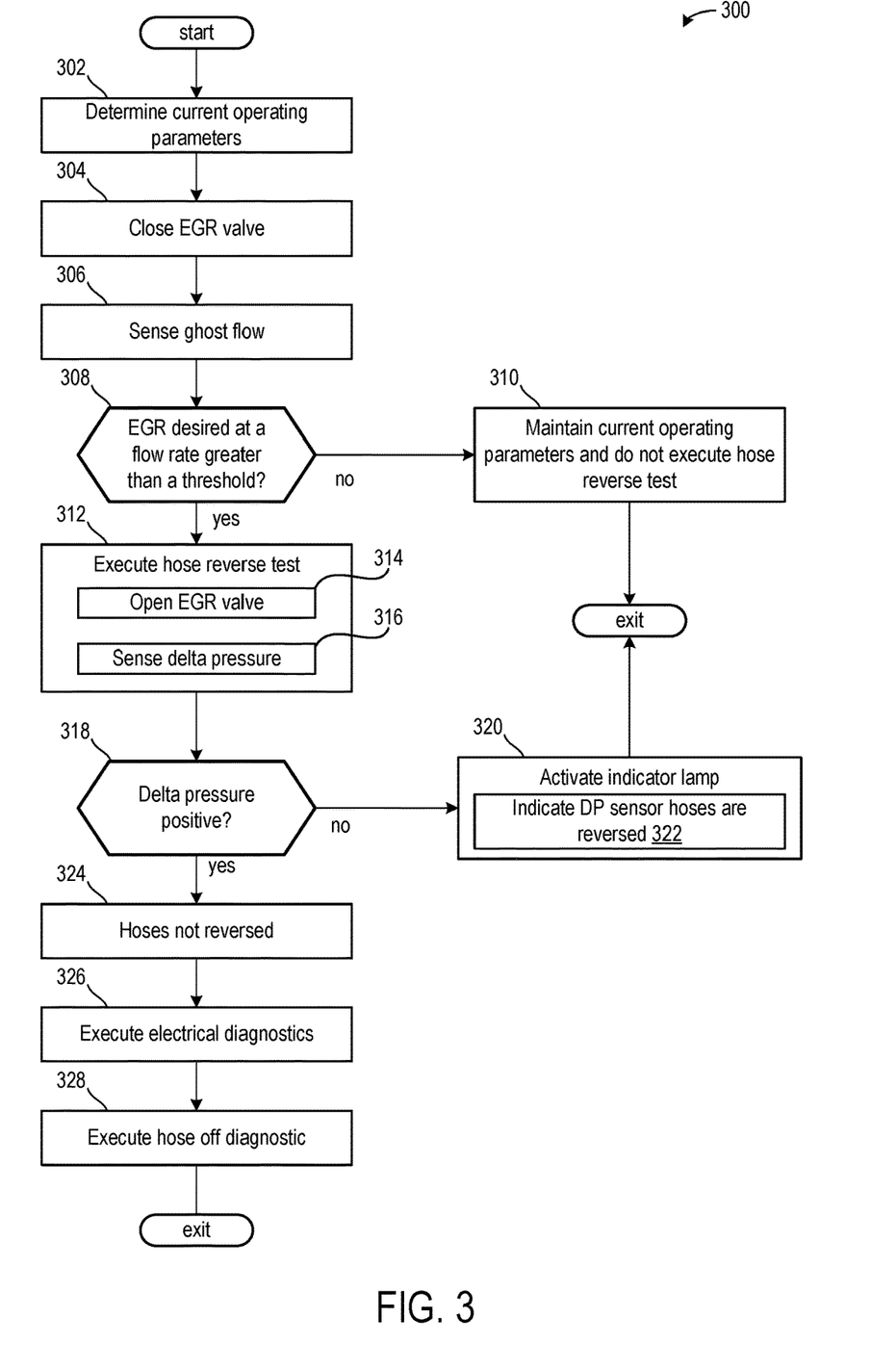
FIG. 3 shows a method for executing a reverse hose diagnostic when the EGR valve is open.
Figure 4:
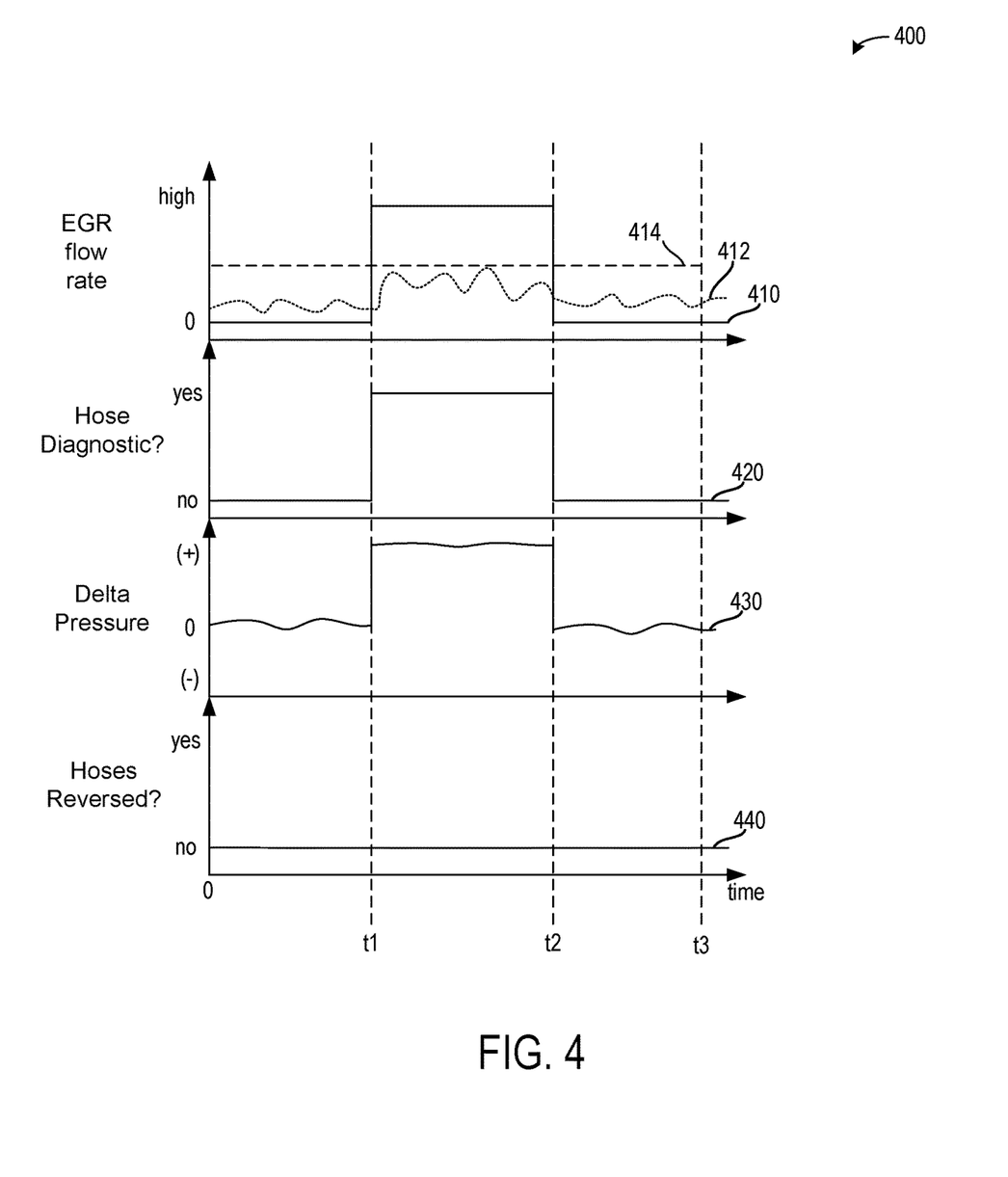
FIG. 4 shows a prophetic engine operating sequence illustrating a reverse hose diagnostic being executed while EGR is flowing with an EGR valve open.
Figure 5:
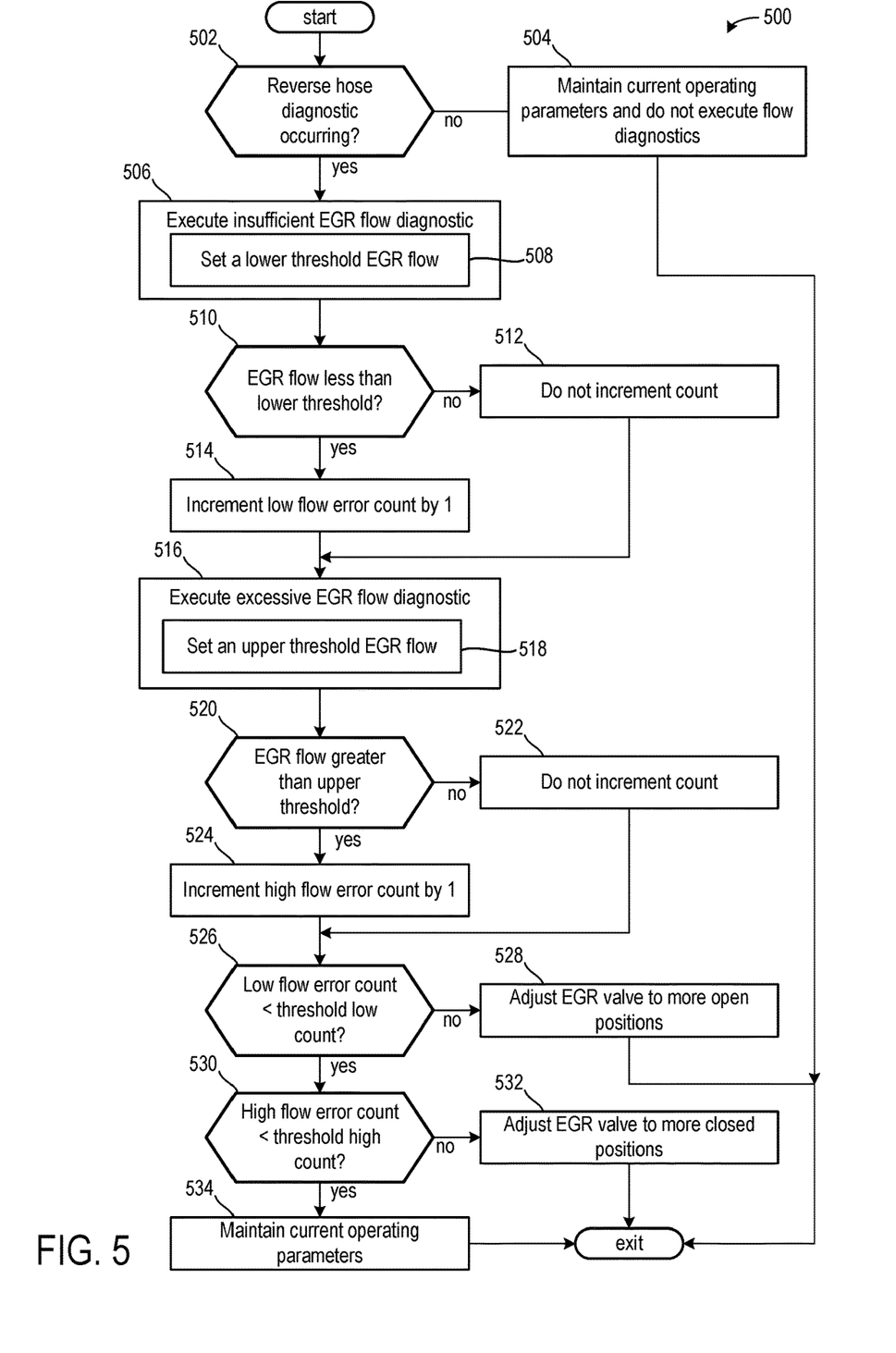
FIG. 5 shows a method for executing insufficient and excessive EGR flow diagnostics in combination with the reverse hose diagnostic.

The following description relates to systems and methods for a reverse hose diagnostic of a delta pressure sensor of an exhaust-gas recirculation (EGR) valve. Ghost flow pulsations may be enhanced in certain engine frameworks, such as a hybrid configuration illustrated in FIG. 1. An example of the delta pressure sensor is illustrated in FIG. 2 as part of a four-cylinder hybrid vehicle. A method for executing a reverse hose diagnostic with an EGR valve in an open position is illustrated in FIG. 3. A prophetic engine operating sequence graphically illustrating the reverse hose diagnostic entry conditions is illustrated in FIG. 4. FIG. 5 shows a method for executing insufficient and excessive EGR flow diagnostics in combination with the reverse hose diagnostic FIG. 1 shows a schematic depiction of a hybrid vehicle system 6 that can derive propulsion power from engine system 8 and/or an on-board energy storage device. An energy conversion device, such as a generator, may be operated to absorb energy from vehicle motion and/or engine operation, and then convert the absorbed energy to an energy form suitable for storage by the energy storage device.

Engine system 8 may include an engine 10 having a plurality of cylinders 30. Engine 10 includes an engine intake 23 and an engine exhaust 25. Engine intake 23 includes an air intake throttle 62 fluidly coupled to the engine intake manifold 44 via an intake passage 42. Air may enter intake passage 42 via air filter 52. Engine exhaust 25 includes an exhaust manifold 48 leading to an exhaust passage 35 that routes exhaust gas to the atmosphere. Engine exhaust 25 may include one or more emission control devices 70 mounted in a close-coupled position or in a far underbody position. The one or more emission control devices may include a three-way catalyst, lean NOx trap, diesel particulate filter, oxidation catalyst, etc. It will be appreciated that other components may be included in the engine such as a variety of valves and sensors, as further elaborated in herein. In some embodiments, wherein engine system 8 is a boosted engine system, the engine system may further include a boosting device, such as a turbocharger (not shown).

Vehicle system 6 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 126 located upstream of the emission control device, temperature sensor 128, and pressure sensor 129. Other sensors such as additional pressure, temperature, air/fuel ratio, and composition sensors may be coupled to various locations in the vehicle system 6. As another example, the actuators may include the throttle 62.

Controller 12 may be configured as a conventional microcomputer including a microprocessor unit, input/output ports, read-only memory, random access memory, keep alive memory, a controller area network (CAN) bus, etc. Controller 12 may be configured as a powertrain control module (PCM). The controller may be shifted between sleep and wake-up modes for additional energy efficiency. The controller may receive input data from the various sensors, process the input data, and trigger the actuators in response to the processed input data based on instruction or code programmed therein corresponding to one or more routines.

In some examples, hybrid vehicle 6 comprises multiple sources of torque available to one or more vehicle wheels 59. In other examples, vehicle 6 is a conventional vehicle with only an engine, or an electric vehicle with only electric machine(s). In the example shown, vehicle 6 includes engine 10 and an electric machine 51. Electric machine 51 may be a motor or a motor/generator. A crankshaft of engine 10 and electric machine 51 may be connected via a transmission 54 to vehicle wheels 59 when one or more clutches 56 are engaged. As shown, a drive axle 53 may be used to transfer power from the transmission 54 to the wheels 59 in one example. The drive axle 53 is a rear axle, in one example. In the depicted example, a first clutch 56 is provided between a crankshaft and the electric machine 51, and a second clutch 56 is provided between electric machine 51 and transmission 54. Controller 12 may send a signal to an actuator of each clutch 56 to engage or disengage the clutch, so as to connect or disconnect crankshaft from electric machine 51 and the components connected thereto, and/or connect or disconnect electric machine 51 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 51 receives electrical power from a traction battery 61 to provide torque to vehicle wheels 59. Electric machine 51 may also be operated as a generator to provide electrical power to charge battery 61, for example during a braking operation.

Turning now to FIG. 2, it shows an embodiment 200 of the engine 10 comprising the cylinders 30. As such, components previously introduced may be similarly numbered in this figure. The intake manifold 44 comprise a plurality of intake runners 45, wherein each runner fluidly couples the intake manifold 44 to an individual cylinder of the cylinders 30. A plurality of exhaust runners 49 fluidly couple the cylinders 30 to the exhaust manifold 48.

The exhaust passage 35 is configured to direct exhaust gases from the exhaust manifold 48 to an ambient atmosphere. An EGR passage 202 branches off of the exhaust passage 35 and is configured to direct exhaust gases from the exhaust passage 35 to the intake manifold 44. Additionally or alternatively, the EGR passage 202 may be fluidly coupled to a portion of an intake passage upstream of the intake manifold 44.

The EGR passage 202 comprises an EGR valve 210. The EGR valve 210 is configured to adjust to a fully open position, a fully closed position, or positions therebetween. The EGR valve 210 may comprise an actuator configured to receive instructions from a controller, such as controller 12 of FIG. 1.

A delta pressure sensor 220 is arranged downstream of the EGR valve 210 within a shared housing 212. The delta pressure sensor 220 comprises a first hose 222 and a second hose 224. The first hose 222 is arranged on an upstream side of a restriction 226 and the second hose 224 is arranged on a downstream side of the restriction 226. In this way, the first hose 222 directs gases from a portion of the shared housing 212 between the EGR valve 210 and the restriction 226 to the delta pressure sensor 220. The second hose 224 directs gases from a portion of the shared housing 212 between the restriction 226 and an outlet of the shared housing 212.

The restriction 226 comprises an orifice 228 through which gases may flow through. The orifice 228, along with the first hose 222 and the second hose 224, may be sized proportionally to one another based on a configuration of the engine 10 and the EGR passage 35. The orifice 228 may comprise an opening size between 5 to 50 mm.

Furthermore, the first hose 222 and the second hose 224 may comprise different lengths and diameters. The first hose 222 and the second hose 224 may comprise a specific orientation. As described above, a reverse hose diagnostic is executed to determine if the first and second hoses are arranged in the desired orientation. In one example, the reverse hose diagnostic is attempted periodically based on a threshold frequency. In some examples, the reverse hose diagnostic is executed during engine operating conditions where a trip distance is greater than a threshold distance (e.g., 1 kilometer).

In one example, if the positions of the first hose 222 and the second hose 224 are reversed then the delta pressure sensor 220 may provide a reversed output. For example, if the second hose 224 is arranged upstream and the first hose 222 is arranged downstream, then the delta pressure sensor 220 may sense negative delta pressures when the value would be positive in a desired configuration of the first and second hoses.

FIGS. 1-2 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

Turning now to FIG. 3, it shows a method 300 for executing a reverse hose diagnostic. Instructions for carrying out method 300 may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

The method 300 begins at 302, which includes determining current engine operating parameters. Current engine operating parameters may include but are not limited to one or more of throttle position, engine speed, engine load, engine temperature, manifold vacuum, vehicle speed, EGR flow rate, and an air/fuel ratio.

The method 300 proceeds to 304, which includes closing an EGR valve. In one example, EGR valve 210 of FIG. 2 is moved to a fully closed position such that exhaust gas does not flow therethrough. As such, exhaust gases may not mix with intake gases.

The method 300 proceeds to 306, which includes sensing a ghost flow. The ghost flow may correspond to intake pulsations due to pressure variations in the intake passage. The ghost flow is a result of intake pulsations being sensed by the delta pressure sensor (e.g., delta pressure sensor 220 of FIG. 2), which may be misinterpreted as EGR flow when the EGR valve is open. However, with the EGR valve closed, the ghost flow noise may be accurately determined. The ghost flow may be based one or more of an engine speed, engine load, and a manifold air flow. In one example, if the manifold air flow increases, then the ghost flow noise may also increase.

The method 300 proceeds to 308, which includes determining if a desired EGR flow rate is greater than a threshold. In one example, the threshold is based on the sensed ghost flow. As such, the threshold may be a dynamic value that increase or decreases as the ghost flow noise increases or decreases. In one example, the threshold is a dynamic value based on a current highest pressure value of a ghost flow noise. As such, there are conditions where the ghost flow noise is relatively low, and therefore the threshold is relatively low, and the reverse hose diagnostic may be executed with less EGR than during other conditions. Additionally or alternatively, the threshold may be based on a highest ghost flow noise value. In this way, changes in ghost flow may not be large enough in magnitude to adjust a delta pressure measurement during a reverse hose diagnostic with the EGR valve open.

If the desired EGR flow rate is not greater than the threshold, then the method 300 proceeds to 310, which includes maintaining current operating parameters and not executing the reverse hose diagnostic. The reverse hose diagnostic is not executed due to the EGR flow rate being at or below the threshold due to a possibility of ghost flow noise affecting the reverse hose diagnostic results. For example, the ghost flow noise may increase during the diagnostic and produce a negative delta pressure value, which may be inaccurately interpreted as a confirmation of the hoses being reversed.

Returning to 308, if the flow rate of the EGR is greater than the threshold, then the method 300 proceeds to 312 to execute the reverse hose diagnostic. This may be because the EGR flow rate is sufficiently high that fluctuations in the ghost glow noise are not high enough to affect the reverse hose diagnostic due to the EGR flow rate being too high (e.g., above the threshold). The reverse hose diagnostic comprises opening EGR valve at 314 and sensing a delta pressure at 316. As such, EGR is directed to the intake passage during the reverse hose diagnostic, where the first hose and the second hose direct gases to the delta pressure sensor and a different between the pressures is determined.

The method 300 proceeds to 318, which includes determining if the delta pressure is positive. In one example, the delta pressure is a relatively large value compared to previous examples of the reverse hose diagnostic where the EGR valve is closed. If the delta pressure is not positive, then the method 300 proceeds to 320, which includes activating the indicator lamp. At 322, the method 300 includes indicating the delta pressure sensor hoses are reversed.

Returning to 318, if the delta pressure is positive, then the method 300 proceeds to 324 which includes indicating that the hoses are not revered. As such, the reverse hose diagnostic is cleared.

The method 300 proceeds to 326, which includes executing EGR system electric diagnostics. This may include checking circuit high and circuit low conditions of the delta pressure sensor.

The method 300 proceeds to 328, which includes executing hose off diagnostics. In one example, the hose off diagnostics are executed to determine if one or more of an upstream hose (e.g., the first hose 222 of FIG. 2) and a downstream hose (e.g., the second hose 224 of FIG. 2) are decoupled from the shared housing. If a fault is determined at either 326 with the electrical circuits or at 328 with the hoses, then a flag may be set.

In one example, the method 300 is passively executed, wherein passive execution includes EGR being demanded based on driver demand, wherein the reverse hose diagnostic is advantageously executed during conditions where the EGR flow rate exceeds the threshold. That is to say, the reverse hose diagnostic is passively executed when driver demand demands an amount of EGR greater than the threshold such that ghost flow noise may not affect the reverse hose diagnostic.

In some examples of the method 300, a vehicle trip from a first location to a second location different than the first location may not include a condition where EGR demand results in an EGR flow rate exceeding the threshold. In such an example, the method 300 may be actively executed, wherein the EGR valve is intrusively opened without an EGR demand being present or with an EGR demand corresponding to EGR flow rate less than the threshold. The EGR valve is moved to a more open position than desired in order to execute the reverse hose diagnostic while muting the ghost flow noise impact on the delta pressure sensor. Engine operating parameters during the active execution of the reverse hose diagnostic may include adjusting a spark timing, a fuel injection timing, a fuel injection amount, and a throttle position. In one example, the spark timing may be advanced or retarded. Additionally or alternatively, the fuel injection timing may be advanced or retarded. Additionally or alternatively, the fuel injection amount may be increased or reduced. Additionally or alternatively, the throttle position may be moved to a more open or a more closed position.

Turning now to FIG. 4, it shows a plot 400 graphically illustrating execution of the reverse hose diagnostic. Plot 410 illustrates an EGR flow rate and dashed plot 412 illustrates a ghost flow noise. Dashed line 414 illustrates a threshold. Plot 420 illustrates if a reverse hose diagnostic is being executed. Plot 430 illustrates a delta pressure. Plot 440 illustrates if the hoses are reversed. Time increases from a left to right side of the figure.

Prior to t1, the EGR flow rate (plot 410) is zero, thereby indicating the EGR valve is closed. The ghost flow noise (plot 412) is relatively low and below the threshold (plot 414). As illustrated, the threshold is a fixed threshold, however, the threshold may be equal to the ghost flow noise in some examples. The hose diagnostic is not being executed (plot 420). The delta pressure varies between relatively low positive and negative values based on the ghost flow noise (plot 430). The hoses are not determined to be reversed (plot 440).

At t1, the EGR flow rate increases as the EGR valve opens. The EGR valve may open in response to an EGR demand based on current engine operating parameters. In response to the EGR flow rate exceeding to a flow rate above the threshold, the hose diagnostic is initiated. Between t1 and t2, the delta pressure is determined to be a relatively high positive value. As illustrated, variations in the delta pressure value between t1 and t2 are relatively small compared to variations prior to t1. This is due to the EGR flow rate being above the threshold, resulting in EGR flow being the dominant pressure force sensed at the delta pressure sensor such that ghost flow fluctuations are relatively small compared to the EGR flow. The hoses are determined to not be reversed between t1 and t2. In this way, the hose diagnostic is advantageously executed during engine operating parameters where EGR is desired based on current engine operating parameters. As such, the hose diagnostic is executed in a passive manner, and the EGR valve is not intrusively opened.

However, it will be appreciated that during some vehicle trips, EGR may not be desired but a reverse hose diagnostic may be desired. In such an example, the EGR valve may be intrusively opened to actively execute the reverse hose diagnostic during conditions where EGR is not desired. In one example, engine operating conditions may be adjusted during the active execution of the reverse hose diagnostic to account for the EGR. In one example, adjusting engine operating parameters during the reverse hose diagnostic includes adjusting a spark timing, fuel injection timing, fuel injection amount, and throttle position. For example, the spark timing may be advanced, the fuel injection timing may be advanced, the fuel injection amount may be increased, and the throttle position may be moved to a more closed position to allow less intake air to flow to the engine. Additionally or alternatively, the spark timing may be retarded, the fuel injection timing may be retarded, the fuel injection amount may be reduced, and the throttle position may be moved to a more open position.

At t3, EGR is no longer desired and the EGR valve moves to a fully closed position. As such, the hose diagnostic is terminated. After t3, the delta pressure fluctuates due to the ghost flow noise. While not illustrated, further EGR system diagnostics may be executed following the reverse hose diagnostic including EGR circuit diagnostics and EGR hose coupling diagnostics.

Turning to FIG. 5, it shows a method 500 for executing insufficient and excessive EGR flow diagnostics during a reverse hose diagnostic. The method 500 begins at 502, which includes determining if a reverse hose diagnostic is occurring. If the reverse hose diagnostic is not occurring, then the method 500 proceeds to 504, which includes maintaining current operating parameters and does not execute insufficient and excessive flow diagnostics.

If the reverse hose diagnostic is being executed, such as the reverse hose diagnostic method shown in FIG. 3, then the method 500 proceeds to 506, which includes executing an insufficient EGR flow diagnostic. The insufficient EGR flow diagnostic comprises setting a lower threshold EGR flow at 508. In one example, the insufficient EGR flow diagnostic comprises monitoring EGR flow to determine if EGR flow is less than a desired rate, which is equal to the lower threshold EGR flow. In one example, the lower threshold EGR flow is based on a tailpipe $NO_x$ output. In one example, if the EGR flow rate is insufficient, then the tailpipe $NO_x$ output may be relatively high.

The method 500 proceeds to 510, which includes determining if an EGR flow is less than the lower threshold. If the EGR flow is not less than the lower threshold, then EGR flow may not be insufficient and the method 500 proceeds to 512, which includes not incrementing a low flow error count. However, if the EGR flow is less than the lower threshold, then the method 500 proceeds to 514, which includes incrementing the low flow error count by one. Additionally or alternatively, the incrementing may include a magnitude of the insufficient flow, wherein the magnitude is based on a difference between the current flow and the lower threshold. In one example, the magnitude increases as the difference increases. Additionally or alternatively, a duration of the low flow may be recorded in conjunction with the incrementing.

Following 512 or 514, the method 500 proceeds to 516 to execute an excessive EGR flow diagnostic. The excessive EGR flow diagnostic comprises setting an upper threshold EGR flow at 518. In one example, the excessive EGR flow diagnostic comprises monitoring EGR flow to determine if EGR flow is greater than a desired rate (e.g., a commanded rate), which is equal to the upper threshold EGR flow. In one example, the upper threshold EGR flow corresponds to a flow rate higher than the lower threshold EGR flow. In one example, the upper and lower threshold EGR flows encompass a desired EGR flow range at which EGR flow is acceptable and meets the desired rate within a tolerance (e.g., within ±20%). While the lower threshold EGR flow may be based on tailpipe $NO_x$ output, the upper threshold EGR flow may be based on one or more of combustion stability and hydrocarbon (HC) output.

The method 500 proceeds to 520, which includes determining if the EGR flow is greater than the upper threshold EGR flow. If the EGR flow is not greater than the upper threshold EGR flow, then the method 500 proceeds to 522, and does not increment a high flow error count. However, if the EGR flow is greater than the upper threshold EGR flow, then the method 500 proceeds to 524, which includes incrementing the high flow error count by one. Additionally or alternatively, a magnitude of the error may be recorded, wherein the magnitude is based on a different between the EGR flow rate and the upper threshold EGR flow. In one example, the magnitude increases as the difference between the EGR flow rate and the upper threshold EGR flow increases.

The method 500 proceeds to 526, to determine if the low flow error count is less than a threshold low flow count. If the low flow error count is not less than the threshold low count, then the method 500 proceeds to 528 to adjust the EGR valve to more open positions when EGR is desired. In one example, an amount of an increase in an opening of the EGR valve is based on the difference between the EGR flow rate and the lower threshold EGR flow described above, wherein as the difference increases, the amount of opening of the EGR valve is proportionally increased.

If the low flow error count is less than the threshold count, then the method 500 proceeds to 530 to determining if a high flow error count is less than a threshold high count. If the high flow error count is not less than the threshold high count, then the method 500 proceeds to 532, which comprises adjusting an EGR valve position to more closed positions may EGR is desired. In one example, the adjusting is based on the difference between the EGR flow and the upper threshold flow, wherein as the difference increases, the EGR valve is commanded to more closed positions relative to positions without the adjusting. In this way, an actual EGR flow rate may be closer to a commanded flow rate.

If the high flow error count is less than the threshold high count, then the method 500 proceeds to 534, which includes maintaining current operating parameters. As such, a position of the EGR valve is not adjusted when EGR is desired to avoid insufficient or excessive EGR flow. By executing the EGR insufficient and excessive flow diagnostics with the reverse hose diagnostic, results of the EGR insufficient and excessive flow diagnostics may be more reliable, thereby allowing the incrementing of the sensed errors described above. In this way, in some examples of the present disclosure, methods 300 and 500 are executed in tandem.

In this way, an EGR reverse hose diagnostic is scheduled to be executed passively when engine operating conditions demand an EGR flow rate greater than a threshold. The technical effect of executing the EGR reverse hose diagnostic when an EGR valve is open is to increase pressures at the delta pressure sensor such that ghost flow noise may not affect the reverse hose diagnostic results. By doing this, the reverse hose diagnostic may comprise a higher fidelity and likelihood of being completed compared to previous examples.

A first aspect of a method comprises executing a reverse hose diagnostic in response to an exhaust-gas recirculate (EGR) flow rate exceeding a threshold.

A first example of the method further includes where the threshold is based on a ghost flow noise. A second example of the method, optionally including the first example, further includes where executing the reverse hose diagnostic further comprises maintaining an EGR valve in an open position. A third example of the method, optionally including one or more of the previous examples, further includes where determining a first hose and a second hose are not reversed in response to a positive delta pressure sensed via a delta pressure sensor. A fourth example of the method, optionally including one or more of the previous examples, further includes where determining the first hose and the second hose are reversed in response to a negative delta pressure sensed via the delta pressure sensor.

An embodiment of a system, comprises an exhaust-gas recirculation (EGR) valve, a delta pressure sensor and a controller with computer-readable instructions stored on non-transitory memory thereof that when executed enable the controller to actuate the EGR valve to an open position and execute a reverse hose diagnostic.

A first example of the system further includes where the instructions further enable the controller to actuate the EGR valve to the open position in response to a driver demand.

A second example of the system, optionally including the first example, further includes where the delta pressure sensor is arranged downstream of the EGR valve between the EGR valve and an intake manifold.

A third example of the system, optionally including one or more of the previous examples, further includes where the delta pressure sensor is arranged between a first hose and a second hose, wherein the first hose is upstream of the second hose relative to a direction of exhaust gas flow.

A fourth example of the system, optionally including one or more of the previous examples, further includes where the instructions further enable the controller to sense a delta pressure via the delta pressure sensor during the reverse hose diagnostic, and wherein the first hose and the second hose are determined to be reversed in response to a sensed negative delta pressure.

A fifth example of the system, optionally including one or more of the previous examples, further includes where the instructions further enable the controller to only execute the reverse hose diagnostic in response to an exhaust-gas recirculate flow rate exceeding a threshold.

A sixth example of the system, optionally including one or more of the previous examples, further includes where the threshold is a fixed threshold based on a highest pressure value of a ghost flow noise.

A seventh example of the system, optionally including one or more of the previous examples, further includes where the threshold is a dynamic value based on a current highest pressure value of a ghost flow noise.

An eighth example of the system, optionally including one or more of the previous examples, further includes where the instructions further enable the controller to passively execute the reverse hose diagnostic, and wherein the EGR valve is moved to the open position based on current operating parameters.

A ninth example of the system, optionally including one or more of the previous examples, further includes where the instructions further enable the controller to actively execute the reverse hose diagnostic, and wherein the EGR valve is moved to the open position intrusively.

A tenth example of the system, optionally including one or more of the previous examples, further includes where the instructions further enable the controller to adjust operating parameters of an engine including one or more of a spark timing, a fuel injection timing, and a fuel injection amount.

An embodiment of a method, comprises determining a threshold based on a ghost flow noise, opening an exhaust gas recirculation (EGR) valve, and executing a reverse hose diagnostic in response to an exhaust gas recirculate flow rate exceeding the threshold.

A first example of the method, further includes where opening the EGR valve is in response to a driver demand.

A second example of the method, optionally including the first example, further includes where the executing further comprises sensing a delta pressure via a delta pressure sensor receiving gases from a first hose and a second hose, wherein a restriction comprising an orifice is arranged between the first hose and the second hose.

A third example of the method, optionally including one or more of the previous examples, further includes where executing an EGR insufficient flow diagnostic and an EGR excessive flow diagnostic in combination with the reverse hose diagnostic.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
 executing a reverse hose diagnostic in response to an exhaust-gas recirculate (EGR) flow rate exceeding a threshold.

2. The method of claim 1, wherein the threshold is based on a ghost flow noise.

3. The method of claim 1, wherein executing the reverse hose diagnostic further comprises maintaining an EGR valve in an open position.

4. The method of claim 1, further comprising determining a first hose and a second hose are not reversed in response to a positive delta pressure sensed via a delta pressure sensor.

5. The method of claim 4, further comprising determining the first hose and the second hose are reversed in response to a negative delta pressure sensed via the delta pressure sensor.

6. A system, comprising:
 an exhaust-gas recirculation (EGR) valve;
 a delta pressure sensor; and
 a controller with computer-readable instructions stored on non-transitory memory thereof that when executed enable the controller to:
 actuate the EGR valve to an open position; and
 execute a reverse hose diagnostic.

7. The system of claim 6, wherein the instructions further enable the controller to actuate the EGR valve to the open position in response to a driver demand.

8. The system of claim 6, wherein the delta pressure sensor is arranged downstream of the EGR valve between the EGR valve and an intake manifold.

9. The system of claim 6, wherein the delta pressure sensor is arranged between a first hose and a second hose, wherein the first hose is upstream of the second hose relative to a direction of exhaust gas flow.

10. The system of claim 9, wherein the instructions further enable the controller to sense a delta pressure via the delta pressure sensor during the reverse hose diagnostic, and wherein the first hose and the second hose are determined to be reversed in response to a sensed negative delta pressure.

11. The system of claim 6, wherein the instructions further enable the controller to only execute the reverse hose diagnostic in response to an exhaust-gas recirculate flow rate exceeding a threshold.

12. The system of claim 11, wherein the threshold is a fixed threshold based on a highest pressure value of a ghost flow noise.

13. The system of claim 11, wherein the threshold is a dynamic value based on a current highest pressure value of a ghost flow noise.

14. The system of claim 6, wherein the instructions further enable the controller to passively execute the reverse hose diagnostic, and wherein the EGR valve is moved to the open position based on current operating parameters.

15. The system of claim 6, wherein the instructions further enable the controller to actively execute the reverse hose diagnostic, and wherein the EGR valve is moved to the open position intrusively.

16. The system of claim 15, wherein the instructions further enable the controller to adjust operating parameters of an engine including one or more of a spark timing, a fuel injection timing, and a fuel injection amount.

17. A method, comprising:
 determining a threshold based on a ghost flow noise;
 opening an exhaust gas recirculation (EGR) valve; and
 executing a reverse hose diagnostic in response to an exhaust gas recirculate flow rate exceeding the threshold.

18. The method of claim 17, wherein opening the EGR valve is in response to a driver demand.

19. The method of claim 17, wherein the executing further comprises sensing a delta pressure via a delta pressure sensor receiving gases from a first hose and a second hose, wherein a restriction comprising an orifice is arranged between the first hose and the second hose.

20. The method of claim 17, further comprising executing an EGR insufficient flow diagnostic and an EGR excessive flow diagnostic in combination with the reverse hose diagnostic.

* * * * *